(12) United States Patent
Mohammed et al.

(10) Patent No.: US 9,915,965 B2
(45) Date of Patent: Mar. 13, 2018

(54) FLEXIBLE, SECURE ENERGY MANAGEMENT SYSTEM

(71) Applicants: Osama Mohammed, Miami, FL (US); Tarek A. Youssef, Miami, FL (US); Ahmed Elsayed, Miami, FL (US)

(72) Inventors: Osama Mohammed, Miami, FL (US); Tarek A. Youssef, Miami, FL (US); Ahmed Elsayed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 324 days.

(21) Appl. No.: 14/658,755

(22) Filed: Mar. 16, 2015

(65) Prior Publication Data
US 2016/0274608 A1 Sep. 22, 2016

(51) Int. Cl.
*G05F 1/66* (2006.01)
*G06Q 30/02* (2012.01)

(52) U.S. Cl.
CPC ........... *G05F 1/66* (2013.01); *G06Q 30/0206* (2013.01)

(58) Field of Classification Search
CPC ............................. G05F 1/66; G06Q 30/0206
See application file for complete search history.

(56) References Cited

U.S. PATENT DOCUMENTS

| | | | | |
|---|---|---|---|---|
| 6,236,942 B1 * | 5/2001 | Bush | ........................ | G01V 1/30 702/13 |
| 8,583,520 B1 * | 11/2013 | Forbes, Jr. | ............. | G05D 17/00 340/870.02 |
| 9,379,549 B2 * | 6/2016 | Sakuma | ..................... | H02J 3/32 |
| 2005/0167498 A1 * | 8/2005 | Ito | ....................... | G06K 7/10851 235/454 |
| 2006/0036345 A1 * | 2/2006 | Cao | ....................... | G05B 13/027 700/108 |
| 2009/0055330 A1 * | 2/2009 | Medasani | .......... | G01R 31/3693 706/2 |
| 2009/0135048 A1 * | 5/2009 | Jordan | .................... | G01S 7/411 342/70 |

(Continued)

*Primary Examiner* — Thomas Lee
*Assistant Examiner* — Santosh R Poudel
(74) *Attorney, Agent, or Firm* — Saliwanchik, Lloyd & Eisenschenk

(57) ABSTRACT

Systems and techniques are disclosed for flexible, secure energy management that enable control of individual devices in a customer site's energy infrastructure, which can allow optimization (e.g., by minimizing energy cost or usage) across the infrastructure. A system management component may centralize optimization and control capabilities across the energy infrastructure by determining an energy model and directing consumption, storage, and energy draw activities for the totality of the energy infrastructure devices. Systems may include modular, secure terminal devices that can be attached to or paired with the devices in an energy infrastructure in order to provide input data such as power load metrics, as well as to control the operation of the devices. A dynamic, adaptive prediction of system parameters, such as future demand, cost, generation capacity, and other metrics, may be provided. Dynamic, adaptive prediction may be performed without detailed historical usage data. A system gateway device may centralize communications between the system devices so that energy customer privacy is maintained.

12 Claims, 5 Drawing Sheets

(56) References Cited

U.S. PATENT DOCUMENTS

| | | | |
|---|---|---|---|
| 2010/0217734 A1* | 8/2010 | Lv | G06N 3/02 706/25 |
| 2010/0274407 A1* | 10/2010 | Creed | H02J 3/14 700/295 |
| 2011/0016342 A1* | 1/2011 | Rowan | G06F 11/3006 713/340 |
| 2011/0046798 A1* | 2/2011 | Imes | H04L 67/42 700/286 |
| 2012/0079357 A1* | 3/2012 | Salsbery | H04W 24/08 714/799 |
| 2012/0095608 A1* | 4/2012 | Murakami | G06Q 10/04 700/291 |
| 2013/0325469 A1* | 12/2013 | Kim | G10L 15/00 704/239 |
| 2013/0345871 A1* | 12/2013 | Kimura | B25J 9/1694 700/258 |
| 2015/0191138 A1* | 7/2015 | Quintero | B60R 16/0231 701/33.9 |
| 2016/0072590 A1* | 3/2016 | Tu | H04B 1/40 455/63.1 |
| 2016/0141873 A1* | 5/2016 | Ellice-Flint | H02J 3/387 307/20 |

* cited by examiner

FLEXIBLE, SECURE ENERGY MANAGEMENT SYSTEM

BACKGROUND

A smart meter is an electronic device that records the consumption of electric energy in various intervals (usually an hour or less) and communicates that information back to the utility for monitoring and billing. Smart meters enable two-way communication between the meter and the central system and can gather data that may be sent to remote reporting sites. Smart meters are often part of an advanced metering infrastructure (AMI), which can include hardware, software, communications, and consumer energy displays and controllers. Consumer privacy has been raised as a concern in some smart meter environments, as the detailed information sent by the smart meter can divulge sensitive information about the behavioral patterns of the individuals living or working at a residence or place of business.

BRIEF SUMMARY

Systems and techniques are disclosed for flexible, secure energy management at an energy customer site. Systems and techniques enable control of individual devices in a site's energy infrastructure, which can allow optimization (e.g., by minimizing energy cost or usage) across the energy system. A site's energy infrastructure may include several kinds of devices, such as energy consuming devices (e.g., appliances, heating/cooling systems), energy storage devices (e.g., batteries), and energy sources (e.g., utility power, photovoltaic panels, local generators).

In some implementations, a system management component may centralize optimization and control capabilities across the energy infrastructure by determining an energy model and directing consumption, storage, and energy draw activities for the totality of the energy infrastructure devices.

In some implementations, systems and techniques for dynamic, adaptive prediction of system parameters, such as future demand, cost, generation capacity, and other metrics, may be provided. Techniques for dynamic, adaptive prediction may in some cases be implemented on a specially trained artificial neural network that can maintain user privacy by reducing the storage of extensive energy customer usage data. These predicted system parameters or characteristics for a time period may be utilized by the system controller in optimizing the energy system.

In some implementations, systems include modular, secure terminal devices that can be attached to or paired with the devices in an energy infrastructure in order to provide input data such as power load metrics, as well as to control the operation of the devices, for example by controlling their power draw or on/off state. In some cases, secure terminal devices may direct the flow of energy from or to the energy storage devices or energy sources to enact an energy model that is optimized, for example, to minimize cost or usage.

In some implementations, a system gateway device may centralize communications between the secure terminal devices, system controller, metering infrastructure, and local or remote management capabilities so that energy customer privacy is maintained. Furthermore, in some implementations, communications between the components in the energy management system may be encrypted to enhance or maintain customer privacy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
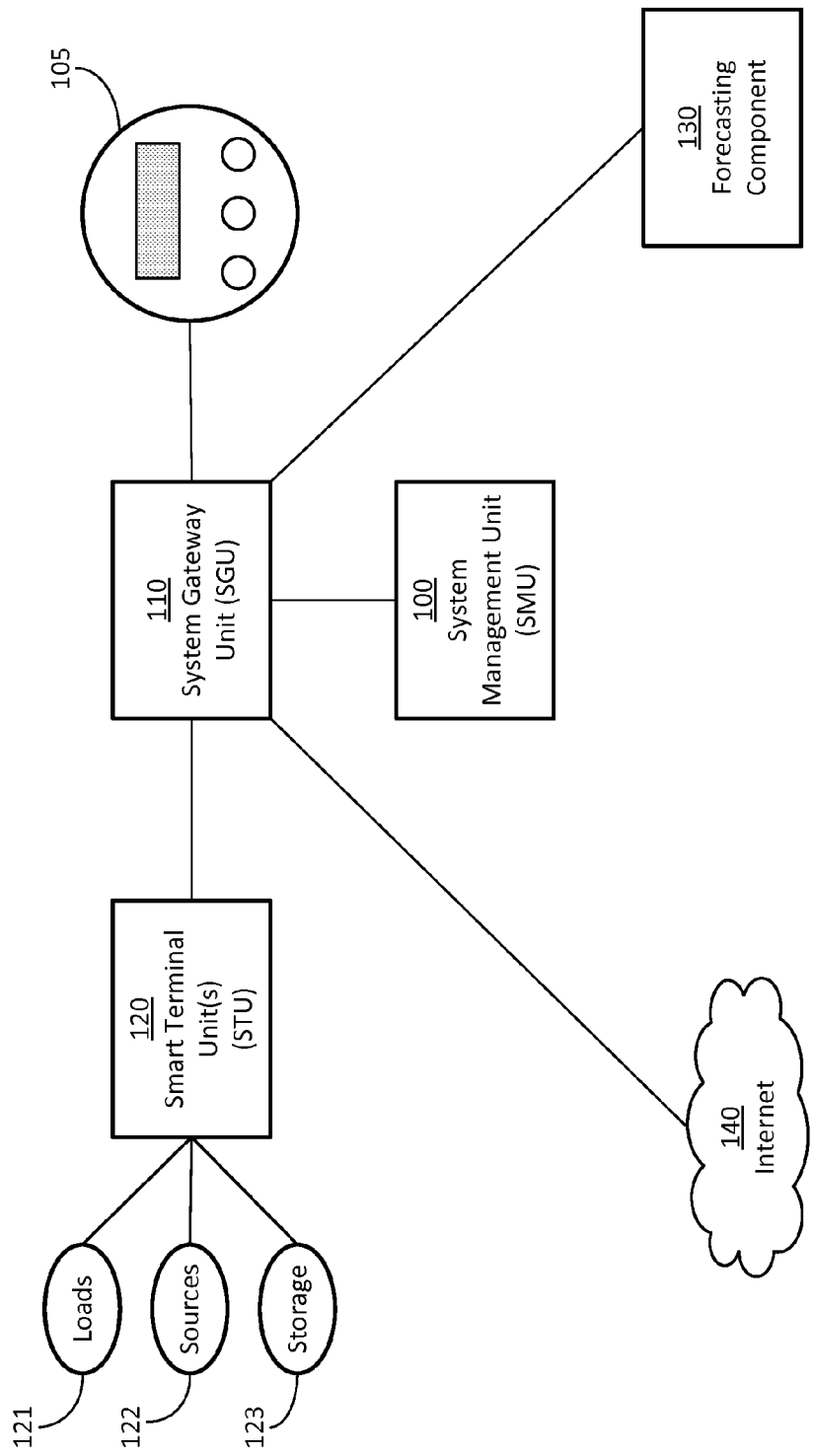
FIG. 1 shows an example component environment for flexible, secure energy management.

Systems and techniques are disclosed for flexible, secure energy management at an energy customer site. Systems and techniques enable control of individual devices in a site's energy infrastructure, which can allow optimization (e.g., by minimizing energy cost or usage) across the energy system. A site's energy infrastructure may include several kinds of devices, such as energy consuming devices (e.g., appliances, heating/cooling systems), energy storage devices (e.g., batteries), and energy sources (e.g., utility power, photovoltaic panels, local generators).

In some implementations, a system management component may centralize optimization and control capabilities across the energy infrastructure by determining an energy model and directing consumption, storage, and energy draw activities for the totality of the energy infrastructure devices.

In some implementations, systems and techniques for dynamic, adaptive prediction of system parameters, such as future demand, cost, generation capacity, and other metrics, may be provided. Techniques for dynamic, adaptive prediction may in some cases be implemented on a specially trained artificial neural network that can maintain user privacy by reducing the storage of extensive energy customer usage data. These predicted system parameters or characteristics for a time period may be utilized by the system controller in optimizing the energy system.

In some implementations, systems include modular, secure terminal devices that can be attached to or paired with the devices in an energy infrastructure in order to provide input data such as power load metrics, as well as to control the operation of the devices, for example by controlling their power draw or on/off state. In some cases, secure terminal devices may direct the flow of energy from or to the energy storage devices or energy sources to enact an energy model that is optimized, for example, to minimize cost or usage.

In some implementations, a system gateway device may centralize communications between the secure terminal devices, system controller, metering infrastructure, and local or remote management capabilities so that energy customer privacy is maintained. Furthermore, in some implementations, communications between the components in the energy management system may be encrypted to enhance or maintain customer privacy.

Technical features such as these (e.g., secure infrastructure, a centralized control point incorporating adaptive prediction capabilities, and the ability to control every device in the energy infrastructure) can result in several advantageous technical effects.

One advantageous technical effect of centralized management is the ability to calculate an optimized energy model for a site's energy infrastructure. Centralized management allows the energy model to be computed from a vantage point of full clarity as to the input data of all of the devices in the energy infrastructure. Centralized management also enables the functioning or operation of each device in the energy infrastructure to be controlled distinctly from the other devices, so that very fine-grained adjustments may be made to enact an optimized energy model.

The centralized management allows a uniformity of determination and control that may not be present at an energy customer site having only a smart meter, or a few smart devices. In these sites, each device acts independently according to its own optimization and control criteria, since calculation of an energy model from a vantage point viewing all the devices may not be possible. Decisions or control activities made independently of the rest of the system devices may be conflicting or not optimized.

Related to centralized management is the ability to control every device in the energy infrastructure by the use of special control units, which herein may be systems called "smart terminal units" or STUs. The best case scenario at most energy customer sites (those that do not implement techniques and systems herein) is that a few devices have smart power management capabilities, and perhaps a smart meter; the rest of the devices are typically legacy devices such as lighting systems, older appliances, older water heaters, etc. In these cases, then, many if not most of the devices provide no ability for discrete measurement of power consumption or other data, and no ability for discrete control of the individual device.

The technical features of the STU in the disclosed flexible, secure energy management system enables full control of potentially all devices, including legacy devices. Thus, the STU (at least in part) enables the information gathering and control that makes the calculation and enactment of an optimized energy model possible. The STU also can provide the network connectivity (e.g., via Wi-Fi or power line signal) that many existing energy infrastructure devices lack.

Further, some technical features enhance the security of customer information and the privacy of customer data and usage patterns. The addition of an STU to the energy management system, for example, enables the STU to encrypt input data from the energy infrastructure device before sending the data over a network. The encrypted data may only be readable to other components in the energy management system, so interception of the input data by unauthorized parties will divulge no useful information. Likewise, instructions from the central management unit to control the device may be encrypted before being sent to the STUs, which can then decrypt the secured instructions. The encryption/decryption of instructions may minimize the threat by hackers who may be attempting to vandalize energy infrastructure devices by sending them spurious control commands.

As noted, technical features like encryption also enhance the privacy of customer data by making the data unreadable to unauthorized parties. The features of a central communications gateway (sometimes referred to herein as a system gateway unit, or SGU) can also isolate components of the flexible, secure energy management system from other parts of the energy infrastructure (such as smart meters) that may divulge information to undesirable third parties, such as data aggregators. The SGU, for example, may communicate with the smart meter but isolate the smart meter from other components in the energy management system and from connectivity with the Internet. Therefore a smart meter may be prevented from divulging customer information to data collectors without explicit permission by the customer.

Techniques and systems also disclose a forecasting capability having adaptive prediction features. The forecasting capability allows the values of certain system parameters to be predicted for a future time period based on the similarity of present factors to past factors. As noted, the adaptive prediction features may be implemented using a specially trained artificial neural network. The predictive feature, in itself, enhances the quality of the optimization of the energy model determination, and thus results in energy savings and lower costs than an energy model determined without predicted values for system parameters. In addition, however, the adaptive prediction techniques described may enhance customer privacy because the training techniques may operate without needing to store customer historical data, or to store data for past time periods for a lengthy time. These techniques are described in more detail in the text associated with FIG. 3.

Additional details of implementations are now described in relation to the Figures.

FIG. 1 shows an example component environment for flexible, secure energy management. It should be noted that the environment in FIG. 1 includes one or more components that may not be present in all implementations or in all instances of an implementation.

Components in the example environment of FIG. 1 may include a system management unit (SMU) 100 for control functions, utility meter 105, system gateway unit (SGU) 110 to coordinate communication between the components, and one or more smart terminal unit(s) (STU) 120 that are connected to energy loads 121, energy sources 122, and/or energy storage devices 123 in a given energy infrastructure. A particular implementation may also include a forecasting component 130 that is capable of dynamic, adaptive prediction of several system parameters that can be used by the SMU 100 in the optimization and analysis techniques. A connection to the Internet 140 for data exchange may also be included.

Components of an energy infrastructure may already be in place at an energy customer site. Energy loads 121 include energy consuming devices such as appliances, heating/cooling systems, manufacturing equipment in a factory, computing equipment, lighting, systems controls, etc. In general, a load is a device that consumes energy as part of its functioning. Energy sources 122 can include utility power, renewable sources such as photovoltaic cells (e.g., solar panels), wind-power, and biomass generation, and local generation capacity such as a natural gas generator. Energy storage 123 devices or systems often include electrochemical storage (e.g., batteries), but can also include, e.g., compressed air energy storage, hydrogen storage, thermal energy storage, and pumped-storage hydroelectricity in certain larger scale energy customer applications. None of the aforementioned examples are intended to be limiting as to the types of devices that may be present in an energy infrastructure.

In some cases an energy load 121 may be a smart device that has the ability to provide input data relevant to energy management, and/or the ability to receive instruction sets to control operational aspects of the device. A smart device, for example, might be an Internet-enabled television that is capable of interacting with a movie streaming service. A smart device might also include a refrigerator that has an interactive display for checking the weather, but which also can provide operational feedback (e.g., the door was left open or the compressor is failing) to its owner, perhaps over the Internet or via an SMS message. Often, smart devices include embedded operating systems, such as Google Android®, that provide a fairly robust amount of data and degree of control over the operation of the device.

Loads 121, sources 122, and storage 123 in many cases may not contain smart device capabilities or the ability to interface with a home area network (HAN). A system terminal unit (STU) 120 is disclosed herein to provide an interface between individual existing or legacy energy infrastructure devices and other components in the flexible, secure energy management system (FSEMS). Additional detail with respect to an STU 120 may be found in the text and accompanying FIG. 4.

An energy infrastructure device that is connected to an STU 120, or in some cases a smart device, is capable of sending input data, for example a measurement of the power flow to the device, and communicating the input data to components in the flexible, secure energy management system. An energy infrastructure device that is connected to an STU 120, or in some cases a smart device, is also capable of directing and controlling power flow to or from the device in response to instructions from the SMU 100. In some cases an STU 120 or smart device with these capabilities may be referred to herein as a "control unit."

An existing energy infrastructure often has a utility meter 105 that measures the flow of electricity to the energy customer systems from the utility company power grid. A utility meter 105 can be unidirectional (measuring electricity flow in one direction only), or bidirectional (measuring a flow of electricity in one direction as a positive reading and in the other direction as a negative reading). In some cases, energy from local renewable energy sources may exceed demand from the energy consuming devices and can be sold to a utility company by funneling excess energy back onto the power grid. The excess energy can be measured in such cases with either a bidirectional utility meter or a second unidirectional utility meter. Different utility companies may have different compensation schemes for the resale of excess power (e.g. power returned to the grid may be a subtraction from the customer's usage, or power returned to the grid may be purchased back from the consumer at a different rate from the rate power is sold).

In some cases, a customer's utility meter 105 may be a "smart meter." A smart meter records consumption of electric energy, often in intervals of an hour or less, and communicates the information back to the utility company for monitoring and billing. A smart meter enables two-way communication between the meter and the central utility system. A smart meter may communicate with other devices through a metering infrastructure interface. In some cases, a smart meter may communicate directly with the utility company via cell and pager networks, satellite, or power line communication. Wi-Fi connectivity to a customer's home network, which may be connected to the Internet, may also be used. In some cases, a low-cost, low-power wireless mesh network interface (such as ZigBee) may provide interconnectivity. A communications protocol such as open smart grid protocol (OSGP) may provide the rules for data exchange when interfacing with the smart meter.

A disadvantage of the two-way communication capability of smart utility meters is that detailed usage reports may be frequently sent to the utility company. These reports may be poorly secured (e.g., sent with customer identifying information or sent unencrypted). These usage reports may allow the utility company or other interceptor to infer behavioral patterns about the occupants of a site, such as when the occupants are asleep or absent from the site. Techniques and systems herein may isolate usage data from the utility company to improve customer privacy.

In cases where a smart meter is not available to an energy customer, an STU 120 may act as a customer meter 105 to read and control the draw of electricity from the power grid.

Figure 2:
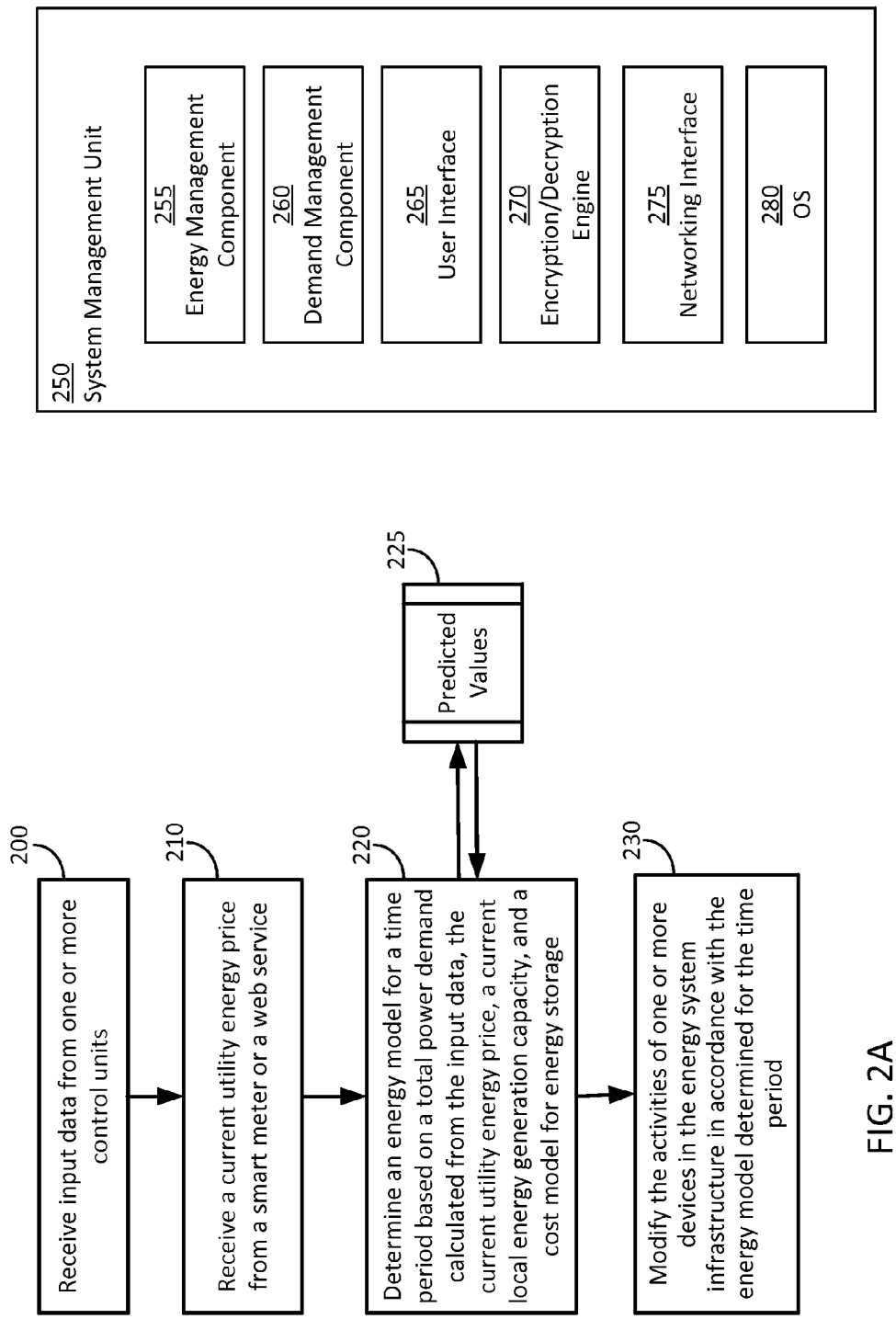
FIGS. 2A-2B show examples of methods and system environments pertaining to an energy management and control capability.

An SMU 100 may implement techniques as described with respect to process flows detailed in FIG. 2A. An SMU 100 may act as the system "brain" or central controlling component. Generally, the SMU 100 receives various kinds of inputs from other energy management system devices, in some cases through a system gateway unit (SGU) 110. These inputs may include, for example, current loads from energy consuming devices; energy input capacity from various energy sources such as utility power, solar panels, or local generation units; and capacity, utilization, and lifetime reduction information from storage devices such as batteries. Inputs to the SMU 100 may also include information about utility prices, as well as forecasted system parameters from a forecasting component.

The SMU 100 may use the inputs from various system components to determine an energy model that manages the scheduling of loads, energy storage operations, as well as when and from which energy sources to pull energy based on an optimization of availability, cost, or other factors. The SMU 100 then directs, in some cases through an SGU 110 and/or STUs 120, the devices in the energy infrastructure to perform according to the energy model.

In some implementations, SMU 100 may receive input for a variety of predicted system parameters from a forecasting component 130. The SMU 100 may use these predicted system parameters as inputs to the energy model to optimize the energy model for an upcoming time period, such as the next hour. One type of predicted system parameter can be the predicted total system load (e.g., total electrical power required by the energy infrastructure) over the future time period. Another type is the predicted local energy generation capacity, which may be influenced by, for example, weather factors (e.g., wind speed, temperature, cloud cover) or time of day. Another type of system parameter is the predicted energy price for power purchased from the utility company over the upcoming time period, which may in some cases be predicted by the forecasting component 130 in addition to or instead of being accessible via a smart utility meter or a web service.

The forecasting component 130, then, may predict the future value of a particular system parameter for a prospective next time period and make the predicted value available to the SMU 100, in some cases through an SGU 110. In some implementations, the forecasting component 130 may instantiate an energy system parameter artificial neural network (ESP-ANN) that uses as inputs a number of diverse factors to determine a prospective output value. In some implementations, the ESP-ANN may use adaptive dynamic training techniques to adjust the calculation factors of the ESP-ANN so that the ESP-ANN learns how a customer's specific energy infrastructure performs over time. In certain implementations, to enhance customer privacy, the ESP- ANN temporarily stores calculated or actual values for training purposes, but does not retain the values after the prospective next time period has elapsed and error calculations for training have been performed. Techniques and systems for a forecasting component 130 are detailed further in the description pertaining to FIG. 3.

An SGU 110 may centralize communications between the STU(s) 120, SMU 100, metering infrastructure 105, forecasting component 130, and local or remote management capabilities so that energy customer privacy is maintained. In some cases one or more component may connect to the Internet 140 to gather information and/or allow the FSEMS functions to be accessible to remote users. Example systems for implementing an SGU 110 are described in FIG. 5.

FIGS. 2A-2B show examples of methods and system environments pertaining to an energy management and control capability.

FIG. 2A shows an example process flow for techniques for energy management. The process flow in FIG. 2A may be implemented, for example, by an SMU 100 as described with respect to FIG. 1. In FIG. 2A, a system management unit 100 may receive input data from one or more control units (200). Input data can include power flow data, such as voltage or current through a passive device (load) or active device (power source). A storage device can be both a load and a source depending on whether the storage device is being charged or is providing power. A total power demand may be calculated by totaling the power flow data received from the various system loads, and/or by measuring the power flow at a utility meter or other central metering point.

The current utility energy price may be obtained from a smart meter or web service (210). In some cases, a smart utility meter may be available that contains the utility's pricing information per unit of power for the current time interval. For example, a utility may charge 11.42 cents per kWh during the daytime, but only 10.1 cents per kWh during the night. Utility power rates can vary, for example, by any or all of season, time of day, type of customer (e.g., business or residential consumer), customer-selected rate plan, and "tier" (in which the rate increases or decreases when the customer's usage passes a usage threshold for a time interval such as a billing month). In some cases, the utility energy price may be obtained by communicating with a web service accessible via a system component such as the SGU 110.

Based (in part) on information received from these devices, an energy model can be determined for a time period (220). An "energy model" is a total energy profile for the energy infrastructure that ultimately controls the behavior of the various devices in the energy infrastructure. Each time period (e.g., the current time or future times or time ranges), may have a different energy model. An energy model directs the activities of each of the specific devices at a specific time, e.g., how much power each load device will draw at the time, how much power will be pulled from each energy source, and whether each storage device is delivering power, being charged, or is latent.

A factor in the energy model may be the local energy generation capacity. The local energy generation capacity is the capability of local energy sources in the energy system infrastructure to generate power. As noted, local energy sources can include renewables such as photovoltaic panels to produce energy from sunlight, biomass generation systems, tidal movement systems for obtaining energy from wave action in water, and turbines or other devices for harnessing energy from wind. Local energy sources can also include local generation capacity such as gas-fired generators. In some cases, an energy storage device, such as a battery, can be considered a local energy source when it is charged and capable of delivering local energy capacity to the system.

These local energy sources have the capability to generate power at various levels, and their capacity often depends on the time of day (e.g., solar energy cannot be gathered at night), quantity of fuel available (e.g., in a biomass energy generation system), or other environmental factors such as the current temperature, wind speed, cloud cover, and tidal levels. Some of these local sources may generate energy at little or no cost per unit of power (e.g., solar), but others, such as gas-fired generators, may incur costs per unit of electrical energy produced. Other local sources may have a low cost per unit but have high maintenance costs. Thus, in some circumstances, the availability of local energy generation capacity, and its cost relative to utility energy from the grid, may be a consideration in determining an energy profile for a given time period.

A factor in the energy model may be the cost model for energy storage. Energy storage is the capability of the system to retain power in stored form for a time period. As noted, energy storage devices or systems can include, for example, batteries, compressed air energy storage, hydrogen storage, thermal energy storage, and pumped-storage hydroelectricity. The energy storage cost model includes the totality of the cost models for all the energy storage devices in the energy infrastructure.

An energy storage activity has a cost model associated with the energy storage. An energy storage cost model includes the charging cost, cost of power losses over time, and a depreciation cost for each discharge cycle (e.g., charging, storing, and discharging) of the storage device. The charging cost is the per-unit cost of storing the energy in the energy storage device. For example, if a battery is charged from utility energy, the per-unit cost of charging is related to the cost of power from the utility at the time of charging, but if the battery is charged from a solar panel, the charging cost may be zero. For example, a battery may be charged at a time when utility power rates are low (e.g., nighttime), and then used as needed during when rates are higher.

The level of storage in the device may also be a factor in the charging cost. For instance, some storage devices have a non-linear storage curve, meaning that the amount of energy required to charge the device differs by the current storage level in the device. For example, some types of rechargeable battery may require more units of power to charge per unit of storage capacity when the battery is very empty or almost full, e.g., it takes more power units to store the final 10% of capacity than when the battery is half-full.

An energy storage device can also have storage losses over a time period, and such losses may be factored into the energy storage cost model. For example, a charged battery typically "leaks" its stored energy over a time period, even though the battery is not being used. The rate at which a storage device leaks energy depends on the category of device (e.g., electrochemical vs. potential energy storage), and the exact configuration or design of the device being used (e.g., a Nickle-Cadmium battery may leak more power over a given time period than a Lithium-ion battery). The leakage rate may also depend on environmental factors in the particular energy infrastructure, such as whether the storage device is placed outside where it is subject to wider temperature fluctuations.

In some cases, an energy storage device has a depreciation cost associated with each cycle of charging, storing, using, and recharging the storage device. Consider batteries, for example: some kinds of battery have a finite lifetime that is proportional to the number of times the battery has been charged and drained. Therefore, a factor in the cost model might be the number of times the battery is capable of a charge-use-recharge cycle before it must be replaced. A per-use cost might then be added to the charging cost each time the battery is recharged.

Other considerations may inform the depreciation cost, depending on the type of storage device. In some cases, the level of energy stored in the device may impact the depreciation cost. Some kinds of battery have longer lifetimes when they are "trickle charged" to almost full. For instance, some kinds of battery are negatively impacted when they are completely drained and so may only be capable of complete draining a few times before they are non-functional. Other kinds of batteries (e.g., "deep cycle") may be capable of complete draining with little or no functional losses.

In some implementations, device metadata or other parameters related to the energy storage device, such as the category, type, manufacturer, original cost, ranges of temperature to which the device will be subject, the age or installation date of the device, etc., may be considerations or factors in computing the cost model for the energy storage device. In some cases, these inputs may be changed or modified by the energy customer, or configured at the time of energy management system setup. In some implementations, a system management unit 100 or other component may store, for example, the number of charge cycles for a device, track the device's age, or otherwise count, increment, or tabulate metrics related to a device to be used in computing the energy storage device cost model.

An energy profile may be optimized in accordance with one or more objectives, such as to minimize energy cost for a time period, to minimize power usage overall or from a specific group of energy sources, to maximize the use of renewable resources, and to minimize total cost including depreciation costs. For example, an energy model optimized to minimize energy costs for the next hour, day, or billing period might perform differently than an energy model calculated to consider all costs, including long term costs. As another example, an energy model optimized to achieve the maximum use of renewable resources in order to obtain a tax credit would likely produce a different outcome than other kinds of objectives. Therefore, an optimization objective may determine which particular actions or instructions are given to various devices in the energy system infrastructure.

In some implementations, more than one optimization objective may be operative in the energy profile. For example, multiple optimization objectives can be achieved by the ability to prioritized or weight the optimization objectives or factors relative to one another. The optimization objective(s) of an energy model may in some implementations be selectable in a given instance by the energy customer via a user interface.

In some implementations, determining the energy model for the time period can also be based on one or more predicted values of an energy management system parameter for a prospective time period (225). An energy management system parameter can include, for instance, a total energy demand, the local energy generation capacity, and the utility energy price. Energy management system parameters can be predicted, for instance, by the similarity of current conditions or factors to past conditions or factors. For example, a variety of conditions might influence the total power demand, such as time of day, outside temperature, cloud cover, etc. Conditions experienced at an earlier time might have resulted in an assessment that each of these factors has a particular, quantifiable amount of influence on the amount of power demanded. Therefore, by using a time of day relating to future time period, the predicted outside temperature, and the forecasted cloud cover, a predicted value of the total power demand may be calculated with some degree of accuracy.

The energy model for a time period may be determined by factoring in the predicted values for the energy management system parameters for a future, but different, time period. In other words, the time period for the energy model determination need not be the same as the future time period relating to the prospective value. For example, the energy model for the next hour may be determined, at least in part, based on the predicted local energy generation capacity for the next eight hours, as for example when a predicted value for the energy output of a solar panel array is determined by an analysis of the upcoming weather forecast. One outcome might be that the energy model for the next hour initiates charging an energy storage device using utility power, since solar power generation is predicted to be minimal due to overcast conditions over the next eight hours. Techniques and systems for predicting energy management system parameters are discussed in more detail with respect to a forecasting component in FIG. 3.

The activities of one or more devices in the energy system infrastructure may then be modified in accordance with the energy model determined for the time period (230). Generally, the activities of the devices are modified by the transmission of instruction sets to the control unit that is attached to the respective energy infrastructure device being modified. As noted, in some cases the control unit is a system terminal unit (STU) 120, and in some cases the control unit may be the control capability/module of a smart device.

One type of activity that may be modified is an energy consumption activity, typically for an energy consuming device. The energy consumption activity may be modified in some cases by directing the control unit to cease, block, or interrupt the power flow to the device for a particular time range. For example, a traditional hot water heater generally operates by supplying power to a tank of water to keep the water at around 120 degrees Fahrenheit at all times, day or night. The energy model may determine that no hot water is used at a given installation from roughly 10 pm to 6 am. In response to this determination, the system may issue an instruction set to the control unit (e.g., STU) associated with the water heater to interrupt power to the water heater during this time period. In some cases, the control unit may direct the energy consuming device to "power down" or shut off during a particular time. For example, an office printer or copy machine may be instructed to turn itself off at 7 pm each day; or, a computer may be instructed to enter "sleep" mode after 10 pm.

Another type of activity that may be modified is an energy storage activity for an energy storage device. The instruction set sent to the control unit may as simple as interrupting the power flow to the charging device, as above. In some cases, however, the instruction set may be different (e.g., more complex) depending on the type, category, or other characteristics of the storage device. For example, some battery storage devices may have longer lifetimes when they are "trickle charged," meaning that the battery receives a regulated recharging power flow that is similar to their stored power loss rate. An instruction set for trickle charging may instruct the control unit to regulate power flow to the storage device at less than the system's full amperage. Other types of battery storage devices may perform better when allowed to experience power loss, but only up to a point since fully emptying the battery diminishes its lifespan. An instruction set for this activity might include an instruction to interrupt power flow to the device now, followed by a later instruction to resume the power flow. In some cases, depending on the capability of the control unit, a single, more complex instruction (e.g., to stop the power flow until the storage devices degrades to 50% capacity) may be issued.

Another type of activity that may be modified is an energy draw activity for an energy source. The instruction set sent to the control unit, again, may include an instruction to interrupt the power flow from the source into the wiring of the energy system, for example by changing the state of a relay. In some cases, the instruction set may instruct the control unit to regulate power from the power source at less than the system's full amperage. For example, optimal functioning of the energy model might direct the various power sources to contribute power to the energy system at varying levels (e.g., all of the output from the solar panel array, supplemented by 10% battery power and the remainder from utility power).

It should be noted that a modification resulting from a determined energy model for a time period can include sending an instruction set directing any combination of one or more types of activities (i.e., energy consumption, storage, and/or draw) to any combination or number of devices (energy consuming, storage, or source).

FIG. 2B shows an example component environment for a system management unit (SMU) 250 that may be present in some implementations to implement techniques as described in FIG. 2A and elsewhere. An SMU 250 may have instances or aspects of a computing system as described in FIG. 6.

Techniques related to determining an energy model, for example, may be part of an energy management component 255 that issues requests to control units for input data, receives the input data, determines an energy model, and generates instruction sets to send to system devices to control their functioning. A demand management component 260 may contain capabilities for scheduling or rescheduling customer loads based on priorities, energy prices, etc., in response to the energy model. For example, a user may be able to set the operation priority of certain devices (e.g., the washing machine) via the user interface 265, and such priorities may be a factor in determining the energy model and associated modifications to energy consumption activities.

It should be noted, however, that an energy management component 255 and a demand management component 260 are logical concepts, and are not intended to convey any particular arrangement of program instruction modules.

In some cases, the SMU 250 may have a user interface 265, which may be accessible to users, administrators, or other individuals. The user interface 265 may be capable, for example, of rendering user interface elements (e.g., web pages) that have key statistics such as current demand or forecasted demand, real time data, or consumption statistics. The user interface 265 may also be able to provide users with management capabilities with which users can tune or modify system operation parameters. The user interface 265 may allow selection of an optimization objective by a user for a particular instance of the FSEMS. In some cases, the user interface 265 may be accessible remotely, such as over the Internet as a web page.

Figure 6:
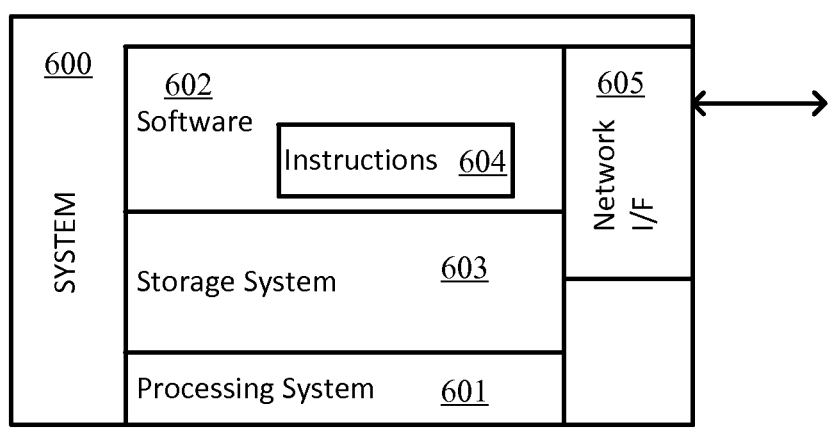
FIG. 6 shows a block diagram illustrating components of a computing device or system used in some implementations of the flexible, secure energy management system.

The SMU 250 may also include an encryption/decryption engine 270, networking interface 275, and OS 280, which are described in more detail with respect to FIG. 6.

As noted with respect to FIG. 2A and elsewhere, a system management unit (e.g., 100, 250) may in some implementations receive predicted values for system parameters from a forecasting component 130. In some implementations, the forecasting component 130 may instantiate an energy system parameter artificial neural network (ESP-ANN) that uses as inputs a number of diverse factors to determine a prospective output value for the system parameters.

Generally, an ANN has of a set of computational units called neurons (or nodes) and a set of weighted, directed connections between these nodes. These variable weights connect nodes both in parallel and in sequence. The weights of the connections determine the strength of the influence that one node has on the other nodes. Generally, there are two ways in which an ANN can be implemented in an analytical system. The first method is through the use of a software-based simulator. An alternative method is to provide the ANN as hardware. Regardless of the implementation, a generic ANN needs to be instantiated and made into a specific ANN to be used in forecasting or problem-solving for a specific set of factors, inputs, and outputs. This process is called "training" the ANN.

A specific ANN (here, the ESP-ANN) is built with a systematic procedure to optimize a performance criterion, which is commonly referred to as the learning rule or process. The learning process typically requires training data. The learning process involves updating the connection weights so that the network can efficiently perform a specific recognition task. The designer of the ANN chooses the network topology, the performance function, the learning rule and the training algorithms, and the criterion to stop the training phase, but the system adjusts the weights.

In some implementations, the network topology for the ESP-ANN used with the forecasting component is a multi-layer feedforward (that is, unidirectional arcs joining nodes and no cycles) net using a backpropagation of error algorithm. Typically, feedforward ANNs include an input layer of neurons, an output layer of neurons and one or more hidden layers of neurons which lie between the input and output layers. Each layer may also have an additional element called a bias node. Bias nodes simply output a bias signal to the nodes of the current layer.

Backpropagation of error means that actual output values for an input are fed back into the system so that a training algorithm uses the resultant error between the predicted and the actual values to adjust the weights. Learning using backpropagation involves two phases. In the first phase, input parameters can be fed into the input neurons. The output neurons produce a result which may differ from the actual result. Any difference between the actual result and the output result can be used to compute an error signal for the output nodes. In the second phase, the error signal can be passed back through all nodes and weight changes made. Some kinds of ANN training algorithms include resilient backpropagation (trainrp), Quasi-Newton (trainbfg), and Levenberg-Marquardt (trainlm). In some implementations of the ESP-ANN, Levenberg-Marquardt is used for its combination of speed and the stability of the results as it trains.

In the ESP-ANN described herein, inputs can include such energy system factors as the time of day, temperature, season, current total system demand, current local energy generation capacity, the current charge state of storage devices, current utility energy price. It should be noted that the aforementioned list of inputs should not be considered limiting, as many energy system factors may constitute the energy system "state." The energy system state is the totality of data values across all the devices in a particular instance of an energy system infrastructure. Thus, the state varies by the types of devices in the particular instance of the energy system infrastructure and by the types of input data obtainable from those devices. The output neurons produce a numeric value containing the prediction (i.e., a regression) for a given system parameter with respect to the inputs that the ESP-ANN has determined are relevant to the system parameter, based on training.

Figure 3:
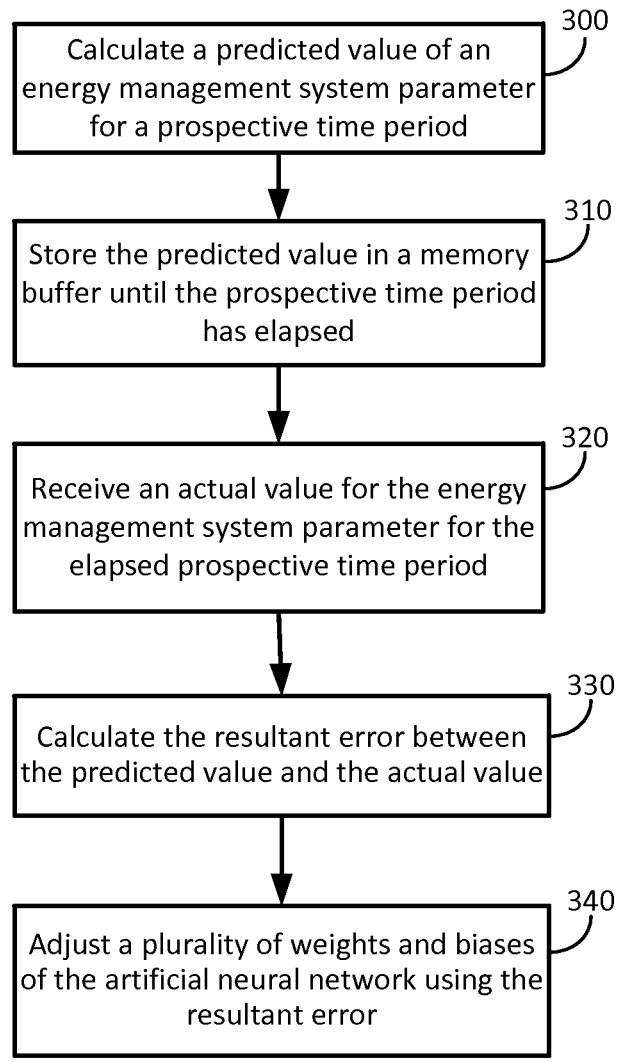
FIG. 3 shows an example process flow for dynamic adaptation in an energy system parameter artificial neural network.

In some implementations, the ESP-ANN may use adaptive dynamic training techniques to adjust the calculation factors of the ESP-ANN so that the ESP-ANN learns how a customer's specific energy infrastructure performs over time. FIG. 3 shows an example process flow for dynamic adaptation in an ESP-ANN.

In FIG. 3, a predicted value for requested energy management system parameter for a prospective time period is calculated (300). The predicted value is then stored in a memory buffer until the prospective time period has elapsed (310). (A memory buffer may be accessible on computer readable storage media, for example). When the prospective time period has elapsed, the actual value for the energy management system parameter for the elapsed time period may be received, such as from a system management unit (320). Once the predicted value and the actual value for the system parameter for the time period are known, a resultant error may be calculated (330). The weights and biases of the ESP-ANN are then adjusted using the resultant error (340), typically as an input to a training algorithm such as Levenberg-Marquardt.

An example may be illustrative: the system management unit requests a predicted value for the total system demand for the next one hour, so that the SMU may determine an energy model. The forecasting component calculates the predicted total system demand for the next hour and stores the predicted value in the memory buffer. After the hour has elapsed, the actual value of the total system demand (for the elapsed, or now past, hour) is obtained. An error calculation is performed on the difference between the two values, and that resultant error is fed back into the training algorithm to adjust the weights and biases of the ESP-ANN.

A drawback with some smart meters and smart devices is that they retain large amounts of historical data—oftentimes a comprehensive history—to be used in forecasting or analysis of energy customer behavior. In some cases, this historical data may be provided or sold to third parties that can use the data to target market products by discerning energy customer behaviors. Sometimes, the historical data may even be obtained by unauthorized parties that can intercept the transmission of the data or retrieve it from online databases to determine, for example, when individuals at a customer site are absent or sleeping. For many energy system customers, the availability of historical records to unseen third parties is a negative consequence of the technical methods used in traditional smart meters and devices.

As noted, one aspect of the techniques and systems herein is privacy enhancement. Techniques herein enable ESP-ANN training to be performed without the storage of large historical data sets. These technical features have the technical benefit of enhanced privacy for the energy system customer. Enhanced system security is also obtained, as a system with little stored historical data may be less susceptible to breach.

In certain implementations, to enhance customer privacy, the ESP-ANN temporarily stores calculated or actual values for training purposes, but does not retain the values after the prospective next time period has elapsed and error calculations for training have been performed. In some cases, privacy enhancement may be accomplished by overwriting the predicted value in the buffer for the system parameter each time the next predicted value for the system parameter is calculated. In some cases, privacy enhancement may be performed by clearing the memory buffer containing the predicted value for the system parameter after the calculation of the resultant error.

A forecasting component 130 may be implemented as a software (or hardware) component on a computing system as described in FIG. 6. In such an implementation, the computing system might be called a "forecasting unit." A forecasting component 130 may also be implemented in some cases as a software (or hardware) component functioning on the same computing device as another system device, e.g., the system management unit 100.

Figure 4:
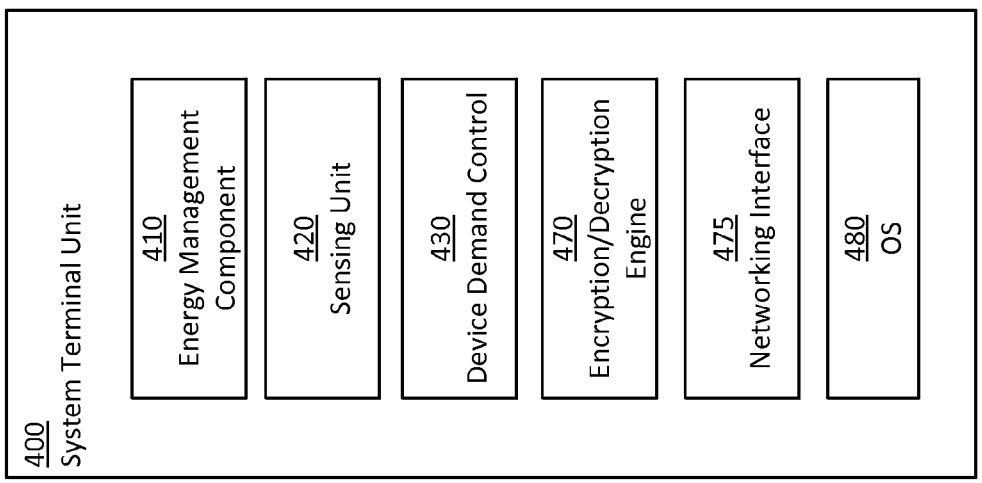
FIG. 4 shows an example component environment for a system terminal unit (STU) that may be present in some implementations.

FIG. 4 shows an example component environment for a system terminal unit (STU) that may be present in some implementations. As noted, a system terminal unit 400 may function as a control unit for individual load, storage, and source devices in the energy system infrastructure with which the STU 400 is paired. An STU 400 can also provide connectivity between the FSEMS and existing devices that may lack network capability. An STU 400 may have instances or aspects of a computing system as described in FIG. 6.

STU 400 can include an energy management component 410, which is capable of receiving requests from a system management unit 100 for input data relating to the particular device the STU 400 is paired with, directing a sensing unit 420 to obtain the data from the device, and sending the input data to the SMU 100. A sensing unit 420 contains various types of sensor modules, for example, power, temperature, humidity, wind speed, relay or charge state sensors, including customized interfaces (e.g. HVAC).

Furthermore, the STU 400, in response to receiving the instruction set from the SMU 100 via the network interface system, can modify the energy consumption, energy storage, or energy draw activity of the paired device, for example by directing the power flow through the particular energy consuming device, energy storage device, or energy source via the device demand control component 430. A device demand control component 430 may contain any combination of a number of types of device control hardware/interface systems, e.g., serial I/O, infrared, etc.

The STU 400 may also include an encryption/decryption engine 470, networking interface 475, and OS 480, which are described in more detail with respect to FIG. 6. Using the encryption/decryption engine 470, for example, the STU 400 may encrypt input data before sending the data to the SMU 100 or other components, as well as decrypt the instruction sets received from the SMU 100.

The STU 400 may be a modular device with respect to its components. In other words, a given instance of an STU 400 may be customized to contain a particular set of components depending on the type of device with which the STU 400 is paired to receive data and execute control operations. An STU's sensing unit may contain any combination of available sensing modules (e.g., power, temperature, relay, charge state, customized). A device demand control component 430 may contain any combination of a number of types of device control hardware/interface systems, e.g., serial I/O, infrared.

For example, an STU 400 connected to a television may have a Wi-Fi network capability operative as one or more of its networking interface 475 modules. This STU 400 connected to a TV may have a basic power sensing module (as part of its sensing unit 420) that can read the current or wattage drawn by the TV. Since most TVs have an infrared sensor already on the TV to receive commands from a remote control, the STU may be equipped with an infrared device demand control component 430 to send appropriate signals to the TV, e.g., to turn the TV off or on.

Figure 5:
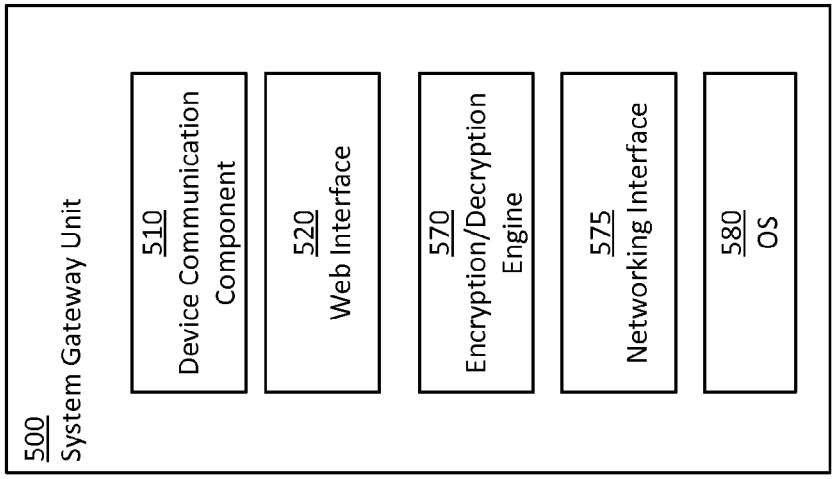
FIG. 5 shows an example component environment for a system gateway unit (SGU) that may be present in some implementations.

FIG. 5 shows an example component environment for a system gateway unit (SGU) that may be present in some implementations. As noted, an SGU 500 may centralize communications between the STU(s) 120, SMU 100, metering infrastructure 105, and local or remote management capabilities so that energy customer privacy is maintained. An SGU 500 may have instances or aspects of a computing system as described in FIG. 6.

An SGU 500 may have a device communication component 510 for relaying messages (e.g., requests for input data, input data, and instruction sets) between energy management system devices. In particular, the SGU 500 may serve to isolate aspects of the energy management system from the metering infrastructure 105 to maintain the privacy of energy customer data, such as usage data. In some cases, as noted, the SGU 500 may serve to provide connectivity to metering infrastructure 105 that is "non-smart" or lacks the connectivity options of smart meters or advanced metering infrastructure (AMI) devices.

In some cases, the SGU 500 may have a web interface 520, which may facilitate connectivity to the internet, for example via a router, cable modem, or other networking device, to make the SMU's user interface 265 available to users from remote locations. The connectivity of the SGU 500 to the internet may also facilitate the gathering of information used by an SMU in determining an energy model (e.g., utility energy price) from web services.

The SGU 500 may also include an encryption/decryption engine 570, networking interface 575, and OS 580, which are described in more detail with respect to FIG. 6. An SGU 500, for example, functioning as it does as a centralized communication point, may have several types of network interface (e.g., Wi-Fi, Zigbee, Ethernet, Power Line Modem (PLC)) to facilitate communications between the various devices.

FIG. 6 shows a block diagram illustrating components of a computing device or system used in some implementations of the flexible, secure energy management system. For example, any computing device operative to run an SMU 100, SGU 110, STU 120, or forecasting component 130, or intermediate devices facilitating interaction between other devices in the environment, may each be implemented as described with respect to system 600. System 600 can itself include one or more computing devices, i.e., the system 600 can include one or more blade server devices, standalone server devices, personal computers, routers, hubs, switches, bridges, firewall devices, intrusion detection devices, mainframe computers, network-attached storage devices, and other types of computing devices. The hardware can be configured according to any suitable computer architectures such as a Symmetric Multi-Processing (SMP) architecture or a Non-Uniform Memory Access (NUMA) architecture.

The system 600 can include a processing system 601, which may include a processing device such as a central processing unit (CPU) or microprocessor and other circuitry that retrieves and executes software 602 from storage system 603. Processing system 601 may be implemented within a single processing device but may also be distributed across multiple processing devices or sub-systems that cooperate in executing program instructions.

Examples of processing system 601 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 603 may comprise any computer readable storage media readable by processing system 601 and capable of storing software 602, including energy management component 255, demand management component 260, forecasting component 130, and device communication component 510. Storage system 603 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal. In addition to storage media, in some implementations, storage system 603 may also include communication media over which software 602 may be communicated internally or externally.

Storage system 603 may be implemented as a single storage device but may also be implemented across multiple storage devices or sub-systems co-located or distributed relative to each other. Storage system 603 may include additional elements, such as a controller, capable of communicating with processing system 601.

Software 602 may be implemented in program instructions and among other functions may, when executed by system 600 in general or processing system 601 in particular, direct system 600 or processing system 601 to operate as described herein for enabling flexible, secure energy management. Software 602 may provide program instructions 604 that implement, at least in part, an SMU 250, STU 400, SGU 500, or forecasting component 130, or subcomponents thereof. Software 602 may implement on system 600 components, programs, agents, or layers that implement in machine-readable processing instructions the methods described herein as performed by an SMU 250, STU 400, SGU 500, or forecasting component 130 (as instructions 604).

Software 602 may also include additional processes, programs, or components, such as operating system software, ANN software, an encryption/decryption engine, or other application software. Software 602 may also include firmware or some other form of machine-readable processing instructions executable by processing system 601.

A device operating system (OS) (e.g., 280, 480, 580) generally controls and coordinates the functions of the various components in the computing device, providing an easier way for applications to connect with lower level components like input devices or capabilities. Non-limiting examples of operating systems include Windows® from Microsoft Corp., Apple® iOS from Apple, Inc., Android® OS from Google, Inc., and the Ubuntu variety of the Linux OS from Canonical.

Some implementations may include "embedded" operating systems, which are operating systems that reside on computer systems with a dedicated function within a larger mechanical or electrical system. Since embedded computer systems have a specific function, they can often be optimized for that function and as a result may have lower power consumption, be smaller, or more inexpensively produced than general purpose computer systems. Embedded operating systems, such as Linux, can be used on embedded computer systems because they allow a high degree of control and customization over which features of the operating system are installed on the embedded device. Energy management system components with dedicated control or routing functions, such as the system terminal unit (STU) 400 or system gateway unit (SGU) 500, may include embedded operating systems, for example.

It should be noted that the operating system may be implemented both natively on the computing device and on software virtualization layers running atop the native device OS. Virtualized OS layers can be thought of as additional, nested groupings within the operating system space, each containing an OS, application programs, and APIs.

In some implementations, one or more energy management system components may include an encryption/decryption engine (e.g., 270, 470, 570). Encryption is the process of encoding messages such that only authorized recipients can read the contents of the messages. The unencoded message, called plaintext, is encrypted with an encryption algorithm to generate ciphertext, which is unreadable unless certain parameters of the encryption algorithm (e.g., the key) are known. Decryption refers to converting the ciphertext back to the plaintext using the key, typically performed by the recipient of the message. Thus, a message may be intercepted by unauthorized parties, but an encrypted message cannot be read without the key. Encryption may be important when transmitting messages across networks (such as Wi-Fi networks) that may be intercepted by other parties besides the sender and receiver.

Some implementations of an energy management system disclosed herein may use encryption techniques available with the network interfaces and protocols (e.g., ZigBee, WPA over Wi-Fi) operative in the system. In some implementations, additional layers of encryption may be used to encode and decode various kinds of data transmitted between energy management system components.

In general, software 602 may, when loaded into processing system 601 and executed, transform system 600 overall from a general-purpose computing system into a special-purpose computing system customized to facilitate flexible, secure energy management. Indeed, encoding software 602 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage.

System 600 may represent any computing system on which software 602 may be staged and from where software 602 may be distributed, transported, downloaded, or otherwise provided to yet another computing system for deployment and execution, or yet additional distribution.

In embodiments where the system 600 includes multiple computing devices, one or more communications networks may be used to facilitate communication among the computing devices. For example, the one or more communications networks can include a local, wide area, or ad hoc network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network interface 605 may be included, providing communication connections and devices that allow for communication between system 600 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

A network interface 605 may provide accessibility to a variety of networks, including for example Wi-Fi, ZigBee, wired Ethernet, and Power line. A power line network enables communications between devices by sending signals over existing power lines at a different frequency from electrical power. A network interface may be included on various system component devices, e.g., the SMU 250, STU 400, and SMU 500. The network interface on a given instance of a system component device may provide accessibility to one or more of the available networks, depending on need. The aforementioned communication media, network, connections, and devices are well known and need not be discussed at length here.

It should be noted that many elements of system 600 may be included in a system-on-a-chip (SoC) device. These elements may include, but are not limited to, the processing system 601, a communications interface 605, and even elements of the storage system 603 and software 602.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for energy management comprising:
   one or more control units, wherein each control unit is paired to a particular energy consuming device, energy storage device, or energy source, wherein each control unit receives an input data, including at least a power flow data, from, and directs a power flow through, the particular energy consuming device, energy storage device, or energy source;

a system management unit comprising a first processing system, a first network interface, a first encryption and decryption engine, one or more first non-transitory computer readable storage media, and program instructions stored on the one or more first non-transitory computer readable storage media that direct the first processing system to:

determine an energy model for a time period based on:
a total power demand calculated from the input data received from the one or more control unit,
a current utility energy price received from a smart meter or a web service,
a current local energy generation capacity, and
a cost model for energy storage;

receive a predicted value of an energy management system parameter from a forecasting module comprising an artificial neural network through a system gateway unit and further enhance the determined energy module, the predicted value being overwritten at each and every time of the calculating of a next predicted value of the energy management system parameter for a next prospective time period; and modify, in accordance with the energy model for the time period, at least one of
an energy consumption activity for one or more energy consuming device,
an energy storage activity for one or more energy storage device, and
an energy draw activity for one or more energy source,
the modifying being performed by sending an instruction set to a particular one of the one or more control unit that is paired to the particular energy consuming device, energy storage device, or energy source; and the system gateway unit for facilitating communication between the system management unit, one or more control units, the smart meter, and the web service, the system gateway unit comprising a second processing system, a second network interface, a second encryption and decryption engine, one or more second non-transitory computer readable storage media, and program instructions stored on the one or more second non-transitory computer readable storage media that direct the second processing system to:

transmit a message, via the second network interface, between the system management unit and the one or more control units, the smart meter, or the web service;

encrypt the message through the first encryption and decryption engine of the system management unit; and decrypt the message through the second encryption and decryption engine of the system gateway unit, the message containing a request, the input data, or the instruction set.

2. The system of claim 1, wherein the energy management system parameter includes a predicted total power demand, a predicted local energy generation capacity, and a predicted utility energy price.

3. The system of claim 1, wherein the cost model for energy storage comprises a power loss rate and a depreciation cost per discharge cycle for one or more energy storage devices.

4. The system of claim 1, wherein a type of the control unit is a smart terminal unit comprising:
a sensing unit;
a device demand control component;
a third network interface;
a third processing system, one or more third non-transitory computer readable storage media, and program instructions stored on the one or more third non-transitory computer readable storage media that direct the third processing system to:
in response to receiving a request from the system management unit, via the third network interface, for the input data from the particular energy consuming device, energy storage device, or energy source to which the control unit is paired, retrieve the input data via the sensing unit and send the input data to the system management unit;
in response to receiving the instruction set from the system management unit, via the third network interface, modify the energy consumption, energy storage, or energy draw activity by directing the power flow through the particular energy consuming device, energy storage device, or energy source via the device demand control component.

5. The system of claim 4, further comprising program instructions stored on the one or more third non-transitory computer readable storage media of the smart terminal unit that direct the third processing system of the smart terminal unit to:
encrypt the input data before sending the input data; and
decrypt the instruction set from the system management unit before modifying the energy consumption, energy storage, or energy draw activity.

6. The system of claim 4, wherein the sensing unit detects one or more of:
the power flow through the particular energy consuming device, energy storage device, or energy source;
a temperature;
a humidity reading;
a current wind speed; and
a current storage level in the particular energy storage device.

7. The system of claim 4, further comprising program instructions stored on the one or more first non-transitory computer readable storage media of the system management unit that direct the first processing system of the system management unit to:
encrypt the instruction set before sending the instruction set; and
decrypt the input data before determining the energy model.

8. The system of claim 1, further comprising program instructions stored on the one or more first non-transitory computer readable storage media that direct the first processing system to display a user interface to select an optimization objective for the energy model; and
wherein determining the energy model for the time period is further based on the optimization objective for the energy model.

9. A method for energy management comprising:
receiving an input data from one or more control unit;
receiving a current utility energy price from a smart meter or a web service;
determining, by a system management unit, an energy model for a time period based on a total power demand calculated from the input data, the current utility energy price, a current local energy generation capacity, and a cost model for energy storage;

receiving a predicted value of an energy management system parameter from a forecasting module comprising an artificial neural network through a system gateway unit and further enhancing the determined energy module, the predicted value being overwritten at each and every time of the calculating of a next predicted value of the energy management system parameter for a next prospective time period;

modifying, by the system management unit, in accordance with the energy model for the time period, at least one of an energy consumption activity for one or more energy consuming device, an energy storage activity for one or more energy storage device, and an energy draw activity for one or more energy source;

encrypting, by a system management unit, a message;

transmitting the message between the system management unit and the one or more control unit through the system gateway unit; and decrypting, by the system gateway unit, the message.

10. The method of claim 9, wherein the energy management system parameter includes a predicted total power demand, a predicted local energy generation capacity, and a predicted utility energy price.

11. The method of claim 9, wherein the energy model is tuned in accordance with an optimization objective for the energy model.

12. The method of claim 11, wherein the optimization objective for the energy model is one or more of:

to minimize energy cost, to minimize power usage from a set of energy sources, to minimize total cost, and to maximize the use of local renewable resources.

* * * * *